May 3, 1960     M. J. STUMBOCK     2,934,815
METHOD OF MANUFACTURING A COLLECTOR RING
Filed March 9, 1954
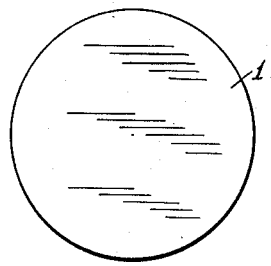
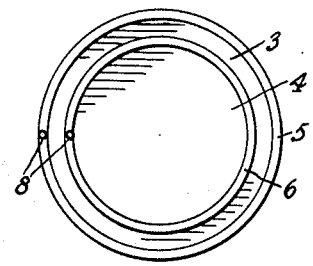
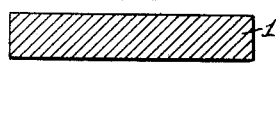
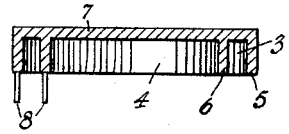
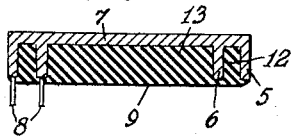
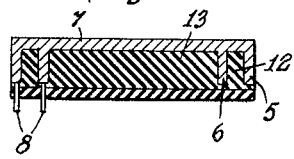
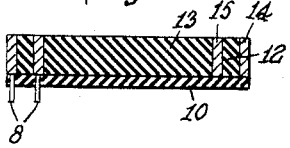
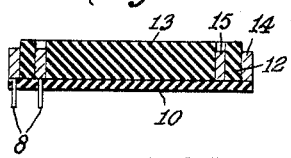
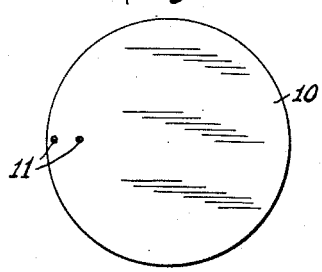
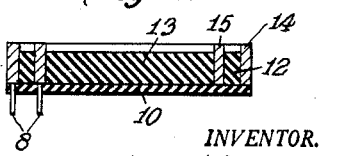
INVENTOR.
MAX J. STUMBOCK
BY
ATTORNEY

United States Patent Office 2,934,815
Patented May 3, 1960

2,934,815
METHOD OF MANUFACTURING A COLLECTOR RING

Max J. Stumbock, South Orange, N.J., assignor to Engelhard Industries, Inc., a corporation of New Jersey Application March 9, 1954, Serial No. 415,074

2 Claims. (Cl. 29—155.54)

The present invention relates to a collector ring assembly and method of manufacture thereof and is concerned in particular with a concentric collector ring assembly of the type associated with a plurality of electrical brush elements.

In the production of concentric collector ring assemblies the electrically conductive rings are generally mounted on a non-conductive base and insulated from each other by an insulating material disposed between the adjacent rings.

There are several methods for producing the collector ring assemblies among which is the method of machining a plurality of individual conductive rings each dimensioned for spaced concentric positioning with respect to each other and then molded into a non-conductive material such as a non-conductive plastic material which forms a base for the ring assembly and simultaneously forms concentric insulating elements disposed between the spaced rings. With such method the rings are likely to deviate from true circular contour due to internal stresses, etc., developed during the machining operations. It is difficult to arrange the rings accurately concentrically and to keep them concentric during the molding operations. Also, plastics suitable for molding have a different coefficient of expansion than the metal rings and the finished plate assembly warps with temperature variations. The difficulty encountered is increased when thermosetting plastics are employed since the hard worked metal rings, e.g. silver rings, may be softened.

Another method involves the use of a laminated plastic mount, or a plastic containing filler material, which provides a rigid plate. The rigid plastic plate is machined to form concentric grooves therein in which grooves individual metal rings are concentrically inserted and secured, e.g. by cementing. With such method it is difficult to match the rings and grooves and to keep them accurately concentric. In a modification of the above mentioned method wherein the machined grooves of the plastic plate are filled with electrodeposited metal, e.g. silver, considerably more work is required and the laminated plastic, etc. is likely to become contaminated with the plating solution to the detriment of the electrical insulating properties of the plastic or other insulating material.

While it is otherwise possible to cement a conductive metal plate to an insulating base and then machine out the rings by removing all the metal between the rings, such rings are then held only by what area is left underneath each ring and the assembly becomes very fragile and it is quite difficult to attach conducting studs or lugs from underneath the rings as generally required.

It is an object of the present invention to provide a collector ring assembly and method for the manufacture thereof which assures accurate concentricity of the rings, retains all the insulating properties of the insulating base and insulating members between the spaced adjacent rings, and is not handicapped by the employment of only machinable insulating materials. It is another object of the present invention to provide a collector ring assembly and method of manufacture thereof which precludes the disadvantages of conventional collector rings and which assures reliable electrical conducting properties. Other objects and advantages of the present invention will become apparent from the description hereinafter following and the drawings forming a part hereof, in which:

Figure 1 illustrates a plan view of a circular disc or plate,

Figure 2 illustrates a cross-sectional view of Figure 1,

Figure 3 illustrates a plan view of a disc including concentric grooves formed therein, Figure 4 illustrates a cross-section view of Figure 3, Figure 5 illustrates a cross-sectional view of Figure 3 including an insulating material filling the grooves, Figure 6 illustrates a plan view of a circular insulating plate, Figure 7 illustrates a cross-sectional view of an assembly of Figures 5 and 6, Figure 8 illustrates a cross-sectional view of a collector ring assembly according to the present invention, Figure 9 illustrates a cross-sectional view of one modification of the invention, and Figure 10 illustrates a cross-sectional view of another modification of the present invention.

According to the present invention a metal plate member 1, substantially as illustrated by Figures 1 and 2, and consisting of an electrically conductive metal, e.g. silver or suitable alloys thereof, is subjected to grooving or channeling operations, such as machining whereby concentric channels or grooves 3 and 4 are formed therein providing concentric spaced ribs 5 and 6 adjacent said grooves. While Figures 3 and 4 of the drawings illustrate a pair of ribs 5 and 6 and a pair of grooves 3 and 4, it is apparent that any suitable number of concentric ribs and grooves may be thus formed on a face of the metal disc 1. After the formation of the grooves and ribs partly through the thickness of the plate 1, e.g. through a major thickness of the plate, the groove and rib forming operation is terminated leaving a base 7 of the metal as a support for the ribs 5 and 6, whereby the said ribs and grooves are maintained in a condition of true concentricity with respect to each other.

Following the said groove and rib forming operation, the ribs 5 and 6 are provided with conducting lugs, studs or pins 8 by silver soldering or welding and thereafter the said grooves 3 and 4 are filled preferably with an excess of insulating material 9, as illustrated by Figure 5, e.g. thermo-setting or self-polymerizing plastic such as Araldite. Before the plastic is set, a rigid backing member or plate 10, as illustrated by Figure 6, is provided and apertures 11 are formed therethrough. The apertures are spaced and located to engage pins 8. The plate 10 is thinly covered on one face with a liquid plastic and the covered face is pressed onto the plastic layer covering the metal ribs, whereby the insulating concentric members 12 and 13 formed by the plastic are securely bonded to and between a plurality of said concentric ribs 5 and 6. When the backing plate 10 has been securely bonded to the liquid plastic by the setting of said liquid plastic as illustrated by Figure 7, the metal base 7 has already completed its function in maintaining the ribs in true spaced concentricity and, therefore, the said base 7 is removed, for example by machining, whereby the previously formed ribs 5 and 6 are transformed into concentric metal rings 14 and 15 in true concentricity with respect to each other, and as illustrated by Figure 8, the concentric metal rings and concentric insulating elements are exposed in a common plane. However, under certain conditions it may be desirable to recess the conductive rings into the plastic, e.g. by machining as illustrated by Figure 9, or to recess the plastic members below the exposed contact faces of the concentric rings as illustrated by Figure 10.

What I claim is:

1. The method of manufacturing a collector ring assembly comprising forming a plurality of spaced concentric grooves in an electrically conductive plate member partly through the thickness thereof and thereby forming a plurality of spaced concentric rib members in said plate, securing an electrically conductive pin member to each of a plurality of said rib members, filling said grooves with insulating means, affixing a rigid plate member to said filled electrically conductive plate with an insulating cement therebetween, removing the ungrooved portion of said electrically conductive plate and thereby converting said rib members to a plurality of concentric rings, with said insulating means therebetween.

2. The method of manufacturing a collector ring assembly according to claim 1 comprising forming a plurality of apertures through said rigid plate member and passing said pins through said apertures in affixing said rigid plate to said filled electrically conductive plate member.

References Cited in the file of this patent

UNITED STATES PATENTS

| | | |
|---|---|---|
| 838,423 | Kitsee | Dec. 11, 1906 |
| 1,268,102 | Drumm | June 4, 1918 |
| 1,831,534 | Judisch | Nov. 10, 1931 |
| 2,424,650 | Dickerman | July 29, 1947 |
| 2,455,864 | Hanna | Dec. 7, 1948 |
| 2,590,160 | Dixon | Mar. 25, 1952 |
| 2,633,481 | Meeks | Mar. 31, 1953 |
| 2,638,660 | Van Gessel | May 19, 1953 |
| 2,743,629 | Pellegrino et al. | May 1, 1956 |
| 2,860,403 | Meyer | Nov. 18, 1958 |

FOREIGN PATENTS

| | | |
|---|---|---|
| 644,565 | Great Britain | Oct. 11, 1950 |